June 17, 1947.   H. J. FRAMHEIN   2,422,538
PALLET TRUCK
Filed Oct. 12, 1943   3 Sheets-Sheet 1

INVENTOR
H. J. Framhein
BY
A. H. Golden
ATTORNEY

June 17, 1947.  H. J. FRAMHEIN  2,422,538
PALLET TRUCK
Filed Oct. 12, 1943   3 Sheets-Sheet 2

INVENTOR
H. J. Framhein
BY
H. H. Golden
ATTORNEY

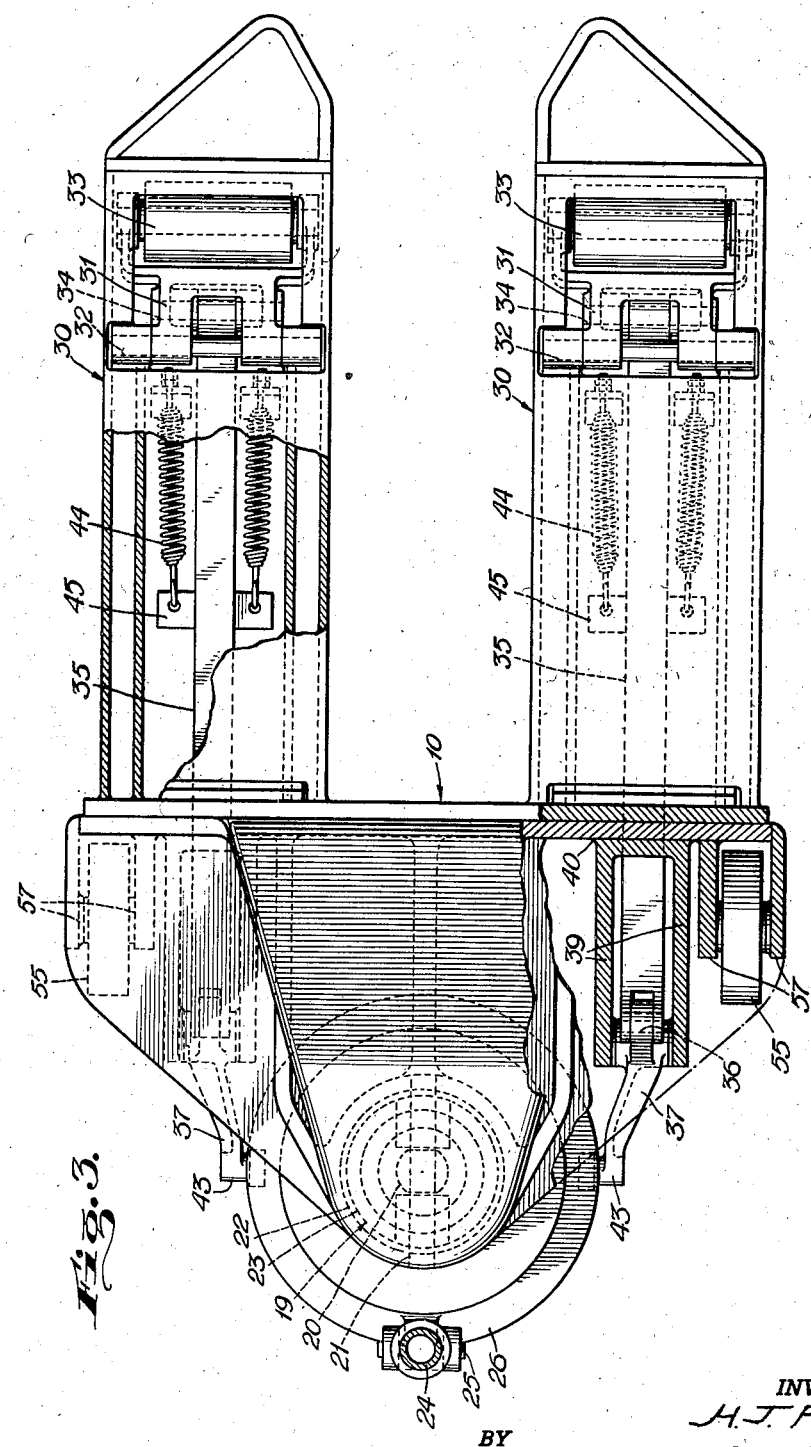

Patented June 17, 1947

2,422,538

UNITED STATES PATENT OFFICE 2,422,538

PALLET TRUCK

Herbert J. Framhein, Chicago, Ill., assignor to The Yale & Towne Manufacturing Company, Stamford, Conn., a corporation of Connecticut Application October 12, 1943, Serial No. 505,920

5 Claims. (Cl. 280—44)

This invention relates to industrial lift trucks, and more particularly to the improvement in industrial trucks shown and claimed in my application Serial No. 458,035 filed September 11, 1942. The invention in the said application is particularly adapted for industrial pallet trucks and contributes means for facilitating the entry of the load platform of an industrial pallet truck between the floors of a pallet.

In brief outline, the invention of my earlier application contributes means for maintaining the load lifting wheels at the rear of the elevating platform in an elevated position spaced from the ground, when the elevating platform is in its fully lowered position. Intermediate wheels are preferably provided for supporting the truck for movement when the load lifting wheels are elevated, the lifting of the elevating platform through the movement of the load lifting wheels acting to raise the intermediate wheels so that they will not interfere with the movement of the truck.

In the present application I illustrate a modification of my earlier invention applied to trucks of the class having an elevating platform on which is mounted a forward lifting wheel and rear lifting wheels, the platform being elevated when the forward lifting wheel and the rear lifting wheels are lowered relatively thereto. A truck of the particular type is fully disclosed in the Raymond Patent No. 1,841,673 dated January 19, 1932.

It is a feature of the invention of this application that when the elevating platform is in its lowered position relatively to the forward lifting wheel, the rear lifting wheels are elevated and spaced from the ground, so as not to interfere with the movement of the truck. A further feature of my invention resides in the use of intermediate wheels secured to the platform and adapted to support the platform for movement when the rear lifting wheels are raised off the ground. As a still further feature of my invention the intermediate wheels are raised off the ground as the rear lifting wheels are lowered incidental to the downward lowering movement of the forward lifting wheel.

I have thus outlined the more important features of my invention in order that my contribution to the art may be better understood and in order that the relation of my contribution to the prior art may be better comprehended. I do believe that my contribution is a broad and valuable one and that I am entitled to patent claims that will prevent newcomers in the field from utilizing my contribution to the art with such variations in physical structure as will readily occur to those skilled in the art. Also, while I have described generally several important features of my invention, there are other important features that will be described particularly in the specification and will be claimed in the claims appended hereto.

Referring now the drawings, Fig. 1 is a vertical elevation and partial section of a truck of the class described to which my invention is applied.

Fig. 3 is a view looking downwardly on the truck.

Figure 1:
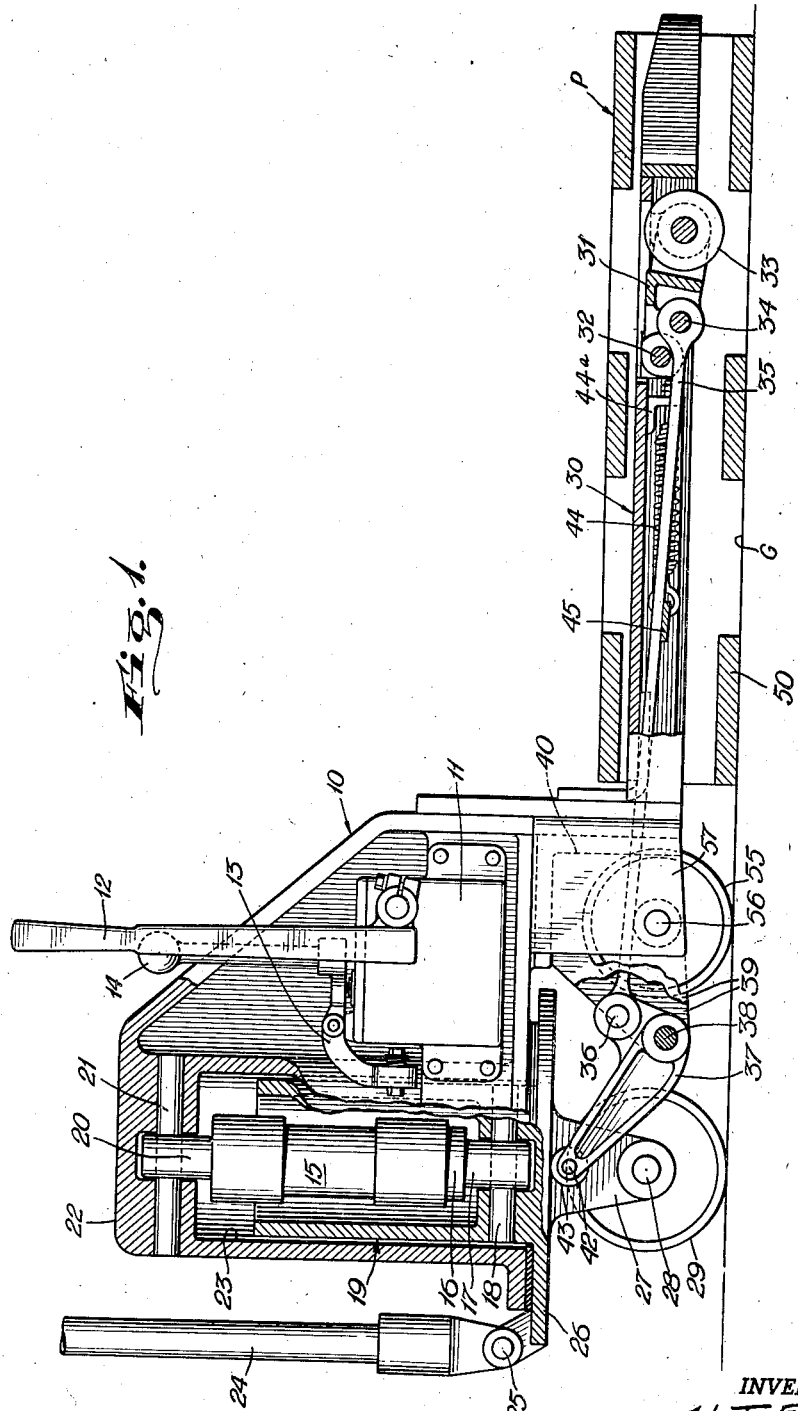

Referring now more particularly to the drawings, the main portion of the truck is in the form of an elevating platform 10 on which at 11 is carried a hydraulic pump adapted to be actuated manually by a handle 12. A release valve operating arm for the pump is designated by reference numeral 13 and is controlled by a handle 14. Incidentally, the pump and its control and operating mechanism are shown in greater detail in my earlier application Serial No. 459,858 filed September 26, 1942, and now abandoned.

The operation of the pump 11 by the handle 12 is of course intended to transmit fluid to a hydraulic ram assembly 15, of which the cylinder portion 16 is pivoted through the shaft 17 and pin 18 to what I term a steering head 19. The ram 20 of the ram assembly is pivoted through the pin 21 to the casting 22 forming part of the elevating platform of the truck as is readily apparent. The steering head 19 is rotatable and slidable within the bore 23 in the casting 22 of the elevating platform and rotating movement is imparted thereto by the steering handle 24 pivoted at 25 to the disc portion 26 of the steering head 19. Downward movement of the steering head from the position of Fig. 1 to the position of Fig. 2 is of course imparted by vertical movement of the ram 20 relatively to the cylinder 16 of the hydraulic ram assembly 15.

The disc portion 26 of the steering head 19 has extending downwardly therefrom the bifurcated axle carrying brackets 27 on which is mounted through axle 28, the steering and forward lifting wheel 29. It is of course now obvious that when the ram 20 is moved relatively to the ram assembly 15 from the position of Fig. 1 to the position of Fig. 2, the steering head 19 moves downwardly carrying with it wheel 29 and thereby lifting the forward end of the elevating platform 10.

I shall now describe the means for lifting the rear end of the elevating platform 10. The rear end of the elevating platform 10 is of the U-type, having a pair of legs each designated by reference numeral 30. Rear wheel lifting links 31 are pivoted to each of the legs 30 at 32, and each lifting wheel link 31 carries a lifting wheel 33. Pivoted at 34 to each link 31 is a tension rod 35 that extends forwardly as best shown in the drawings and is pivoted at 36 to a bell crank lever 37.

There is of course a bell crank lever at each side of the truck pivoted through the shaft 38 relatively to a pair of brackets 39 welded at 40 to form an integral part of the elevating platform 10. Each of the bell crank levers 37 supports on pivot shaft 42 a roller 43 that is maintained against the underside of the disc 26 of the steering head 19.

Springs 44 are each secured at one end to an angle member 44a fixed to the elevating platform, and at the other end to the opposite ends of a plate 45 that is welded to each of the tension rods 35. It is obvious that the action of the springs 44 maintains the rollers 43 against the underside of the disc 26 of the steering head 19 and the lifting wheels 37 upwardly off the ground. In trucks following the teachings of the prior art, the lifting wheels 33 would, in the particular position of the parts in Fig. 1 in which the elevating platform is shown lowered, be against the ground G and therefore in obstructing relation to the several boards 50 of the pallet P. In accordance with the teachings of my invention, the relationship of the lifting wheel links 31 relatively to the bell crank levers 37 and tension rods 35 is such that when the elevating platform 10 is in its fully lowered position of Fig. 1, the wheels 33 are maintained spaced from the ground G and therefore out of obstructing relation to the several boards 50 of the pallet P.

Figure 2:
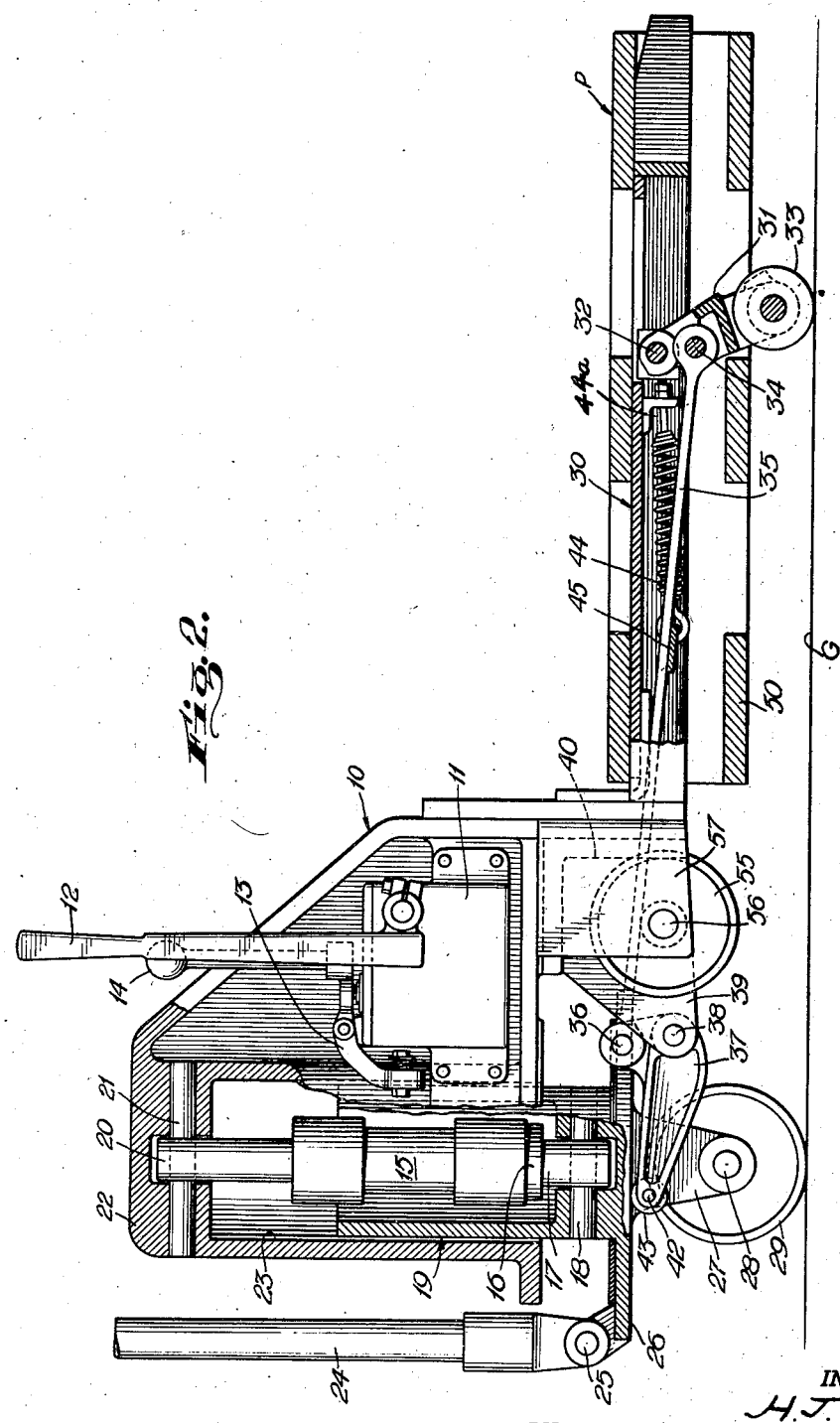
Fig. 2 illustrates the truck of Fig. 1 in the elevated position of the elevating platform.

In order that the truck of Fig. 1 may be moved about when the wheels 33 are off the ground, intermediate wheels 55 are preferably provided, there being an intermediate wheel at each side of the truck. As is clearly shown in the drawings, the intermediate wheels 55 are supported through axles 56 carried by brackets 57 welded to the elevating platform 10 to form an integral part thereof. Because when the truck is unloaded as in Fig. 1, the main portion of the weight thereof is at its forward end, it may be readily manipulated on its forward steering and lifting wheel 29 and the intermediate wheels 55, the springs 44 functioning at this point to hold the lifting wheels 33 upwardly in the position illustrated in Fig. 1.

If the pump 11 be now operated by the handle 12 to lower the steering head 19 to the position of Fig. 2 relatively to the platform 10, it is obvious that the bell crank levers 37 will be rotated through their rollers 43. This movement of the bell crank levers 37 will actuate the tension rods 35 to rotate the rear wheel lifting links 31 to their position of Fig. 2 whereby to lift the legs 30 comprising the rear end of the elevating platform 10. This movement of the rear wheel lifting links 31 by the tension rods 35 will of course be opposed by the springs 44. When the elevating platform is lowered once again to its position of Fig. 1, the springs 44 will act to move the lifting wheels 33 back to their position of Fig. 1 and continue to maintain the rollers 43 of bell crank levers 37 against the underside of the disc 26.

The operation and construction of my invention should now be apparent to those skilled in the art.

I now claim:

1. In a truck of the class described, an elevating platform, a forward lifting wheel, bearing means formed on said elevating platform mounting said forward lifting wheel for vertical sliding movement on the forward end of said elevating platform, lifting means for imparting downward vertical movement to said forward lifting wheel on said bearing means relatively to said elevating platform and thereby to elevate said elevating platform relatively to the ground, rear lifting wheels, means mounting said rear lifting wheels on the rear end of said elevating platform for vertical lifting movement relatively to said elevating platform, means of connection between said forward lifting wheel and said rear lifting wheels whereby downward vertical movement of said forward lifting wheel relatively to said elevating platform imparts downward vertical movement to said rear lifting wheels relatively to said elevating platform to lift the forward and rear ends of said elevating platform, intermediate wheels on said elevating platform adapted to contact the ground when said elevating platform is in its lowered position relatively to said forward lifting wheel and the ground, and the said means of connection holding said rear lifting wheels spaced upwardly from the ground when said elevating platform is in said lowered position.

2. In a truck of the class described, an elevating platform, a forward lifting wheel, bearing means formed on said elevating platform mounting said forward lifting wheel for vertical sliding movement on the forward end of said elevating platform, lifting means for imparting downward vertical movement to said forward lifting wheel on said bearing means relatively to said elevating platform and thereby to elevate said elevating platform relatively to the ground, rear lifting wheels, means mounting said rear lifting wheels on the rear end of said elevating platform for vertical lifting movement relatively to said elevating platform, means whereby the downward vertical movement of said forward lifting wheel relatively to said elevating platform is accompanied by downward vertical movement of said rear lifting wheels relatively to said elevating platform whereby to lift the forward and rear ends of said elevating platform, intermediate wheels on said elevating platform adapted to contact the ground when said elevating platform is in its lowered position relatively to said forward lifting wheel and the ground, and the said rear lifting wheels being held spaced upwardly from the ground when said elevating platform is in said lowered position.

3. In a truck of the class described, an elevating platform, a forward lifting wheel, bearing means formed on said elevating platform mounting said forward lifting wheel for vertical sliding movement on the forward end of said elevating platform, lifting means for imparting downward vertical movement to said forward lifting wheel on said bearing means relatively to said elevating platform and thereby to elevate said elevating platform relatively to the ground, rear lifting wheels, means mounting said rear lifting wheels on the rear end of said elevating platform for vertical lifting movement relatively to said elevating platform, means whereby downward vertical movement of said forward lifting wheel relatively to said elevating platform is accompanied by downward vertical movement of said rear lifting wheels relatively to said elevating platform whereby to lift the forward and rear ends of said elevating platform, intermediate wheels on said elevating platform adapted to contact the ground when said elevating platform is in its lowered position relatively to said forward lifting wheel and the ground, and means holding said rear lifting wheels spaced upwardly from the ground when said elevating platform is in said lowered position.

4. In a truck of the class described, an elevating platform, a forward lifting wheel, bearing means formed on said elevating platform mounting said forward lifting wheel for vertical sliding movement on the forward end of said elevating platform, lifting means for imparting downward vertical movement to said forward lifting wheel on said bearing means relatively to said elevating platform and thereby to elevate said elevating platform relatively to the ground, rear lifting wheels, means mounting said rear lifting wheels on the rear end of said elevating platform for vertical lifting movement relatively to said elevating platform, actuating means for imparting downward vertical movement to said rear lifting wheels relatively to said elevating platform simultaneous with downward vertical movement of said forward lifting wheel relatively to said elevating platform whereby to lift simultaneously the forward and rear ends of said elevating platform, intermediate wheels on said elevating platform adapted to contact the ground when said elevating platform is in its lowered position relatively to said forward lifting wheel and the ground, and the said actuating means holding said rear lifting wheels spaced upwardly from the ground when said elevating platform is in said lowered position.

5. In a truck of the class described, an elevating platform, a forward lifting wheel, means formed bodily on said elevating platform mounting said forward lifting wheel for vertical sliding movement on the forward end of said elevating platform, a hydraulic lifting mechanism comprising a ram element and a cylinder element, one of said elements being secured to said forward lifting wheel and the other to said elevating platform for imparting downward vertical sliding movement to said forward lifting wheel relatively to said elevating platform, rear lifting wheels, means mounting said rear lifting wheels on the rear end of said elevating platform for vertical lifting movement relatively to said elevating platform, actuating means for imparting downward vertical movement to said rear lifting wheels relatively to said elevating platform simultaneous with downward vertical movement of said forward lifting wheel relatively to said elevating platform whereby to lift simultaneously the forward and rear ends of said elevating platform, intermediate wheels on said elevating platform adapted to contact the ground when said elevating platform is in its lowered position relatively to said forward lifting wheel and the ground, and the said actuating means holding said rear lifting wheels spaced upwardly from the ground when said elevating platform is in said lowered position.

HERBERT J. FRAMHEIN.

REFERENCES CITED

The following references are of record in the file of this patent:

UNITED STATES PATENTS

| Number | Name | Date |
|---|---|---|
| 1,841,673 | Raymond | Jan. 19, 1932 |
| 2,234,925 | Hastings, Jr. | Mar. 11, 1941 |
| 2,325,396 | Hastings, Jr. | July 27, 1943 |
| 2,274,164 | Quayle | Feb. 24, 1942 |
| 2,110,424 | Quayle | Mar. 8, 1938 |